United States Patent

[11] 3,593,506

[72] Inventors James H. Casada;
 Edward M. Smith, both of Lexington, Ky.
[21] Appl. No. 851,891
[22] Filed Aug. 21, 1969
[45] Patented July 20, 1971
[73] Assignee The University of Kentucky Research Foundation
 Lexington, Ky.

[54] TOBACCO PLANT HARVESTER
 12 Claims, 16 Drawing Figs.
[52] U.S. Cl. .................................. 56/27.5, 214/5.5
[51] Int. Cl. .................................. A01d 45/16
[50] Field of Search .......................... 56/27.5; 214/5.5

[56] References Cited
 UNITED STATES PATENTS
 2,813,390 11/1957 Irvine ............................ 56/27.5
 3,059,401 10/1962 Woods ........................... 56/27.5

Primary Examiner—Louis G. Mancene
Assistant Examiner—J. N. Eskovitz
Attorney—William E. Sherwood ABSTRACT: A harvester for tobacco plants is provided for towing by a prime mover to which an articulated frame is attached, the frame mounting a movable turret having spears on which tobacco stalks are impaled. During removal of the stalks from the spears, they are loaded on sticks which are then manually removed from the harvester.

A hydraulic system powered from the prime mover serves to actuate each of the turrets, an empty stick supplying mechanism, a loaded stick removing mechanism, and the mechanism for transferring stalks from the spears to the sticks; and a mechanical power takeoff shaft driven by the prime mover drives the conveyor which moves stalks after being cut from their root systems to the turret for impaling on the spears.

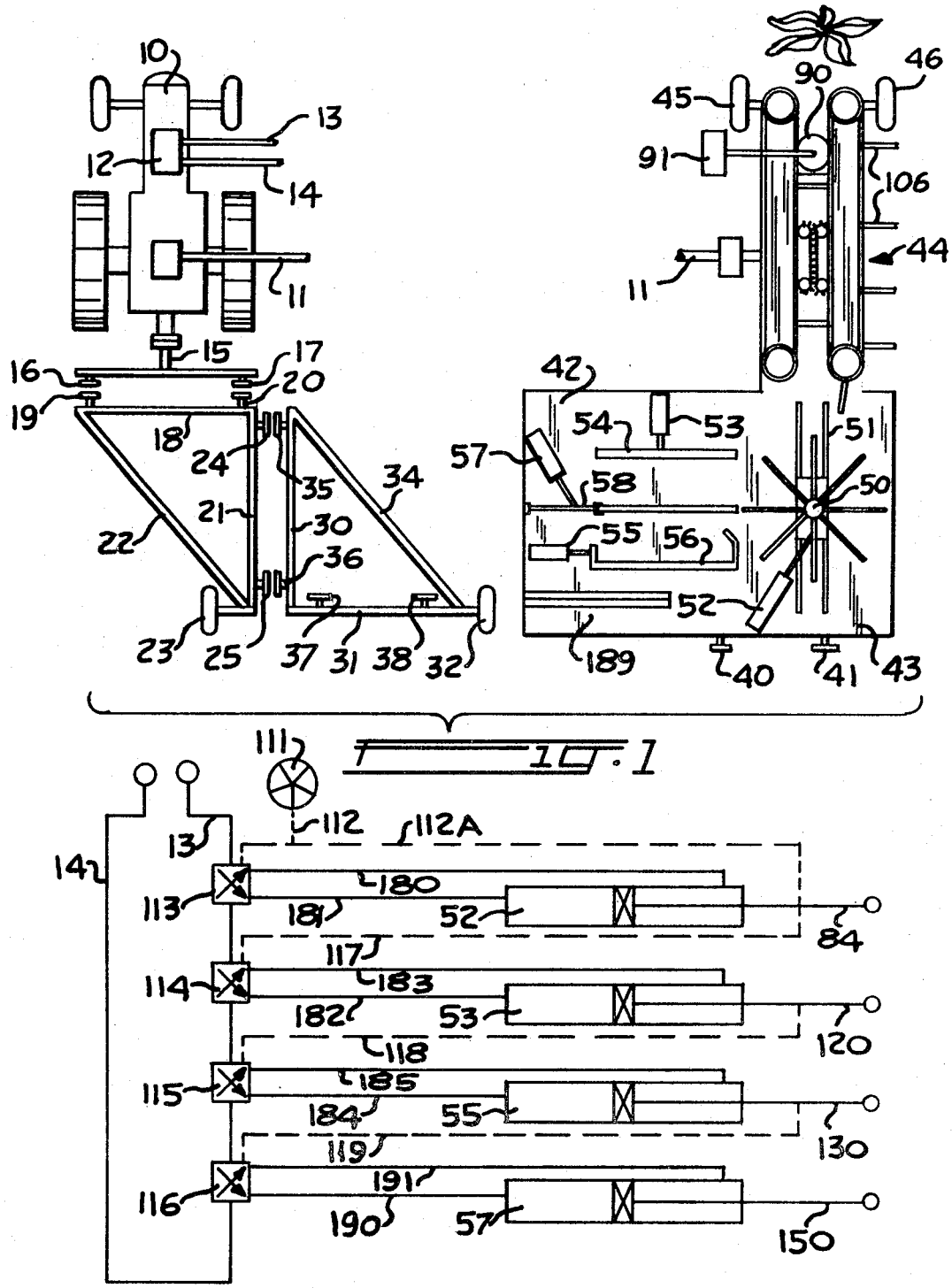

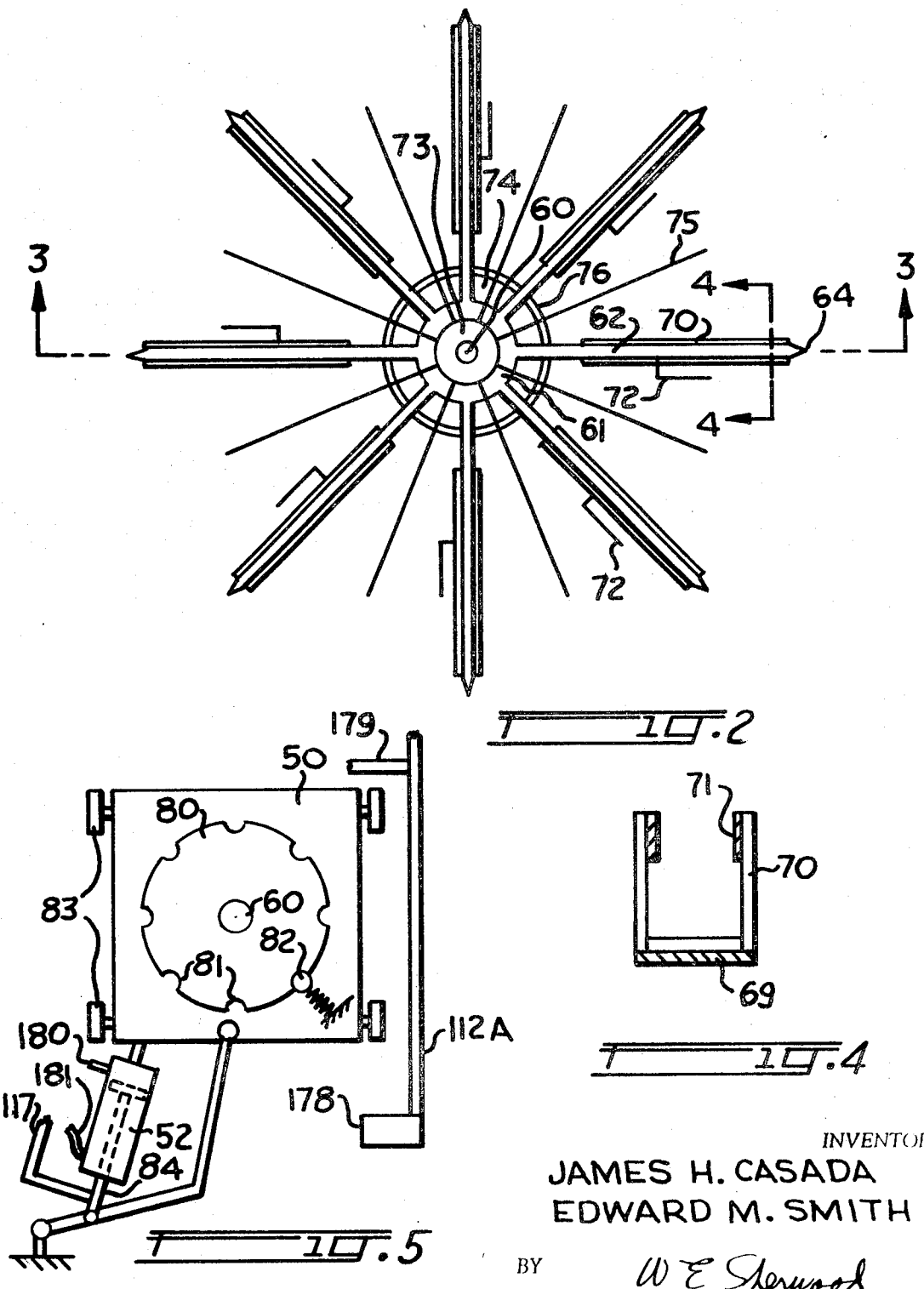

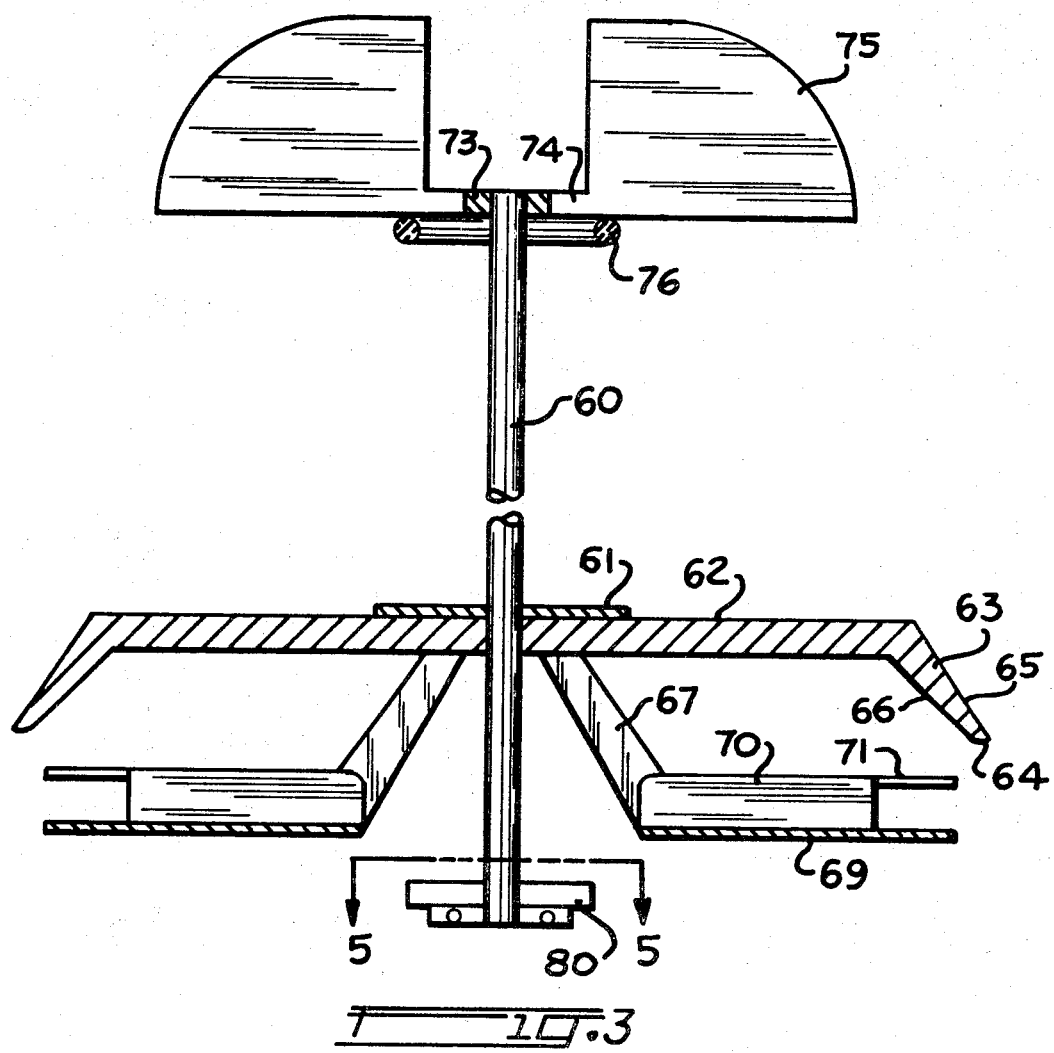
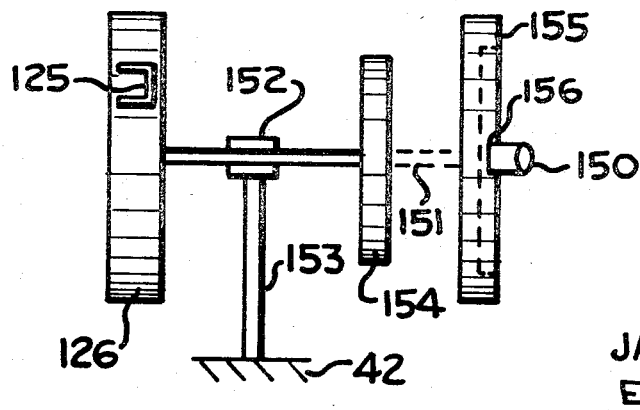

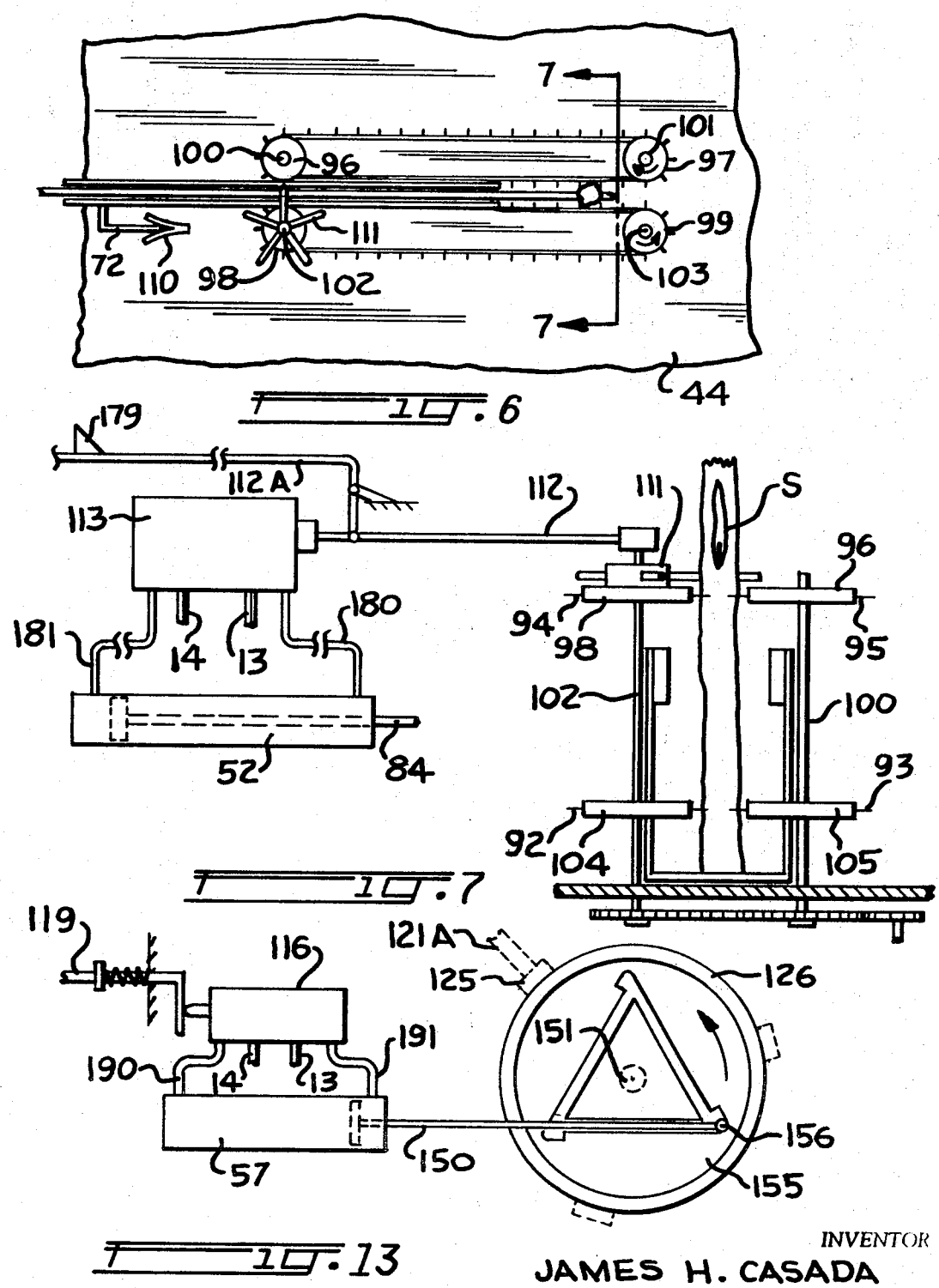

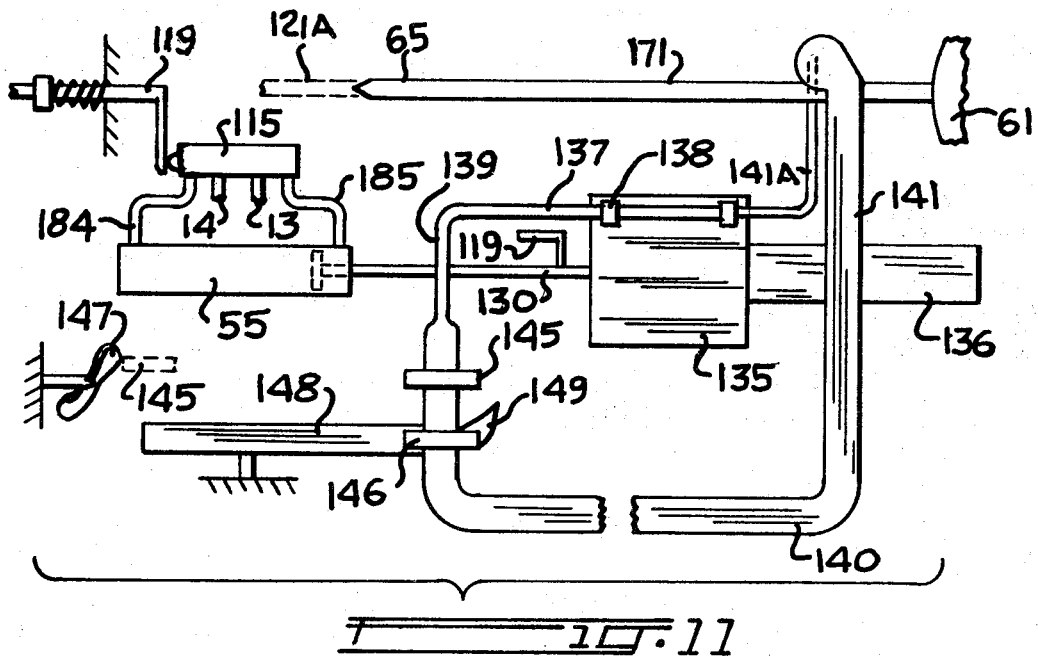
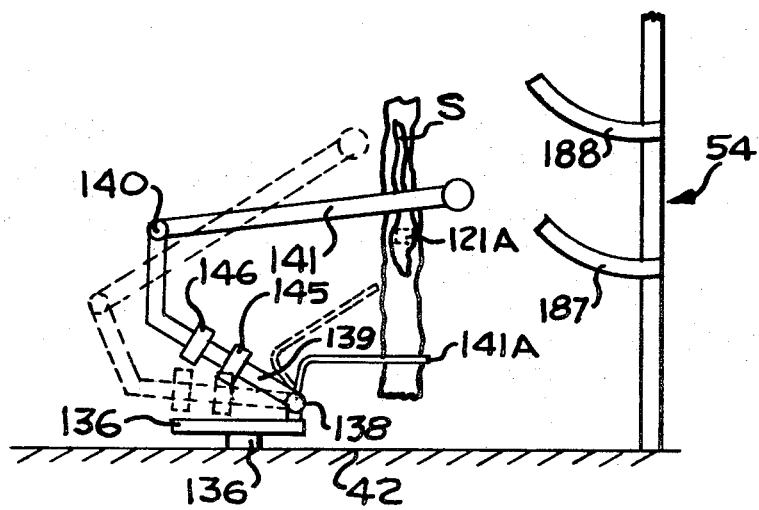
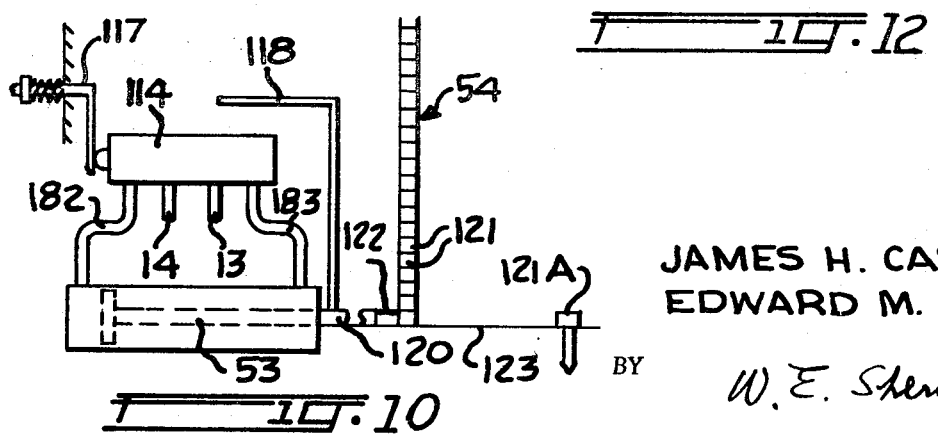

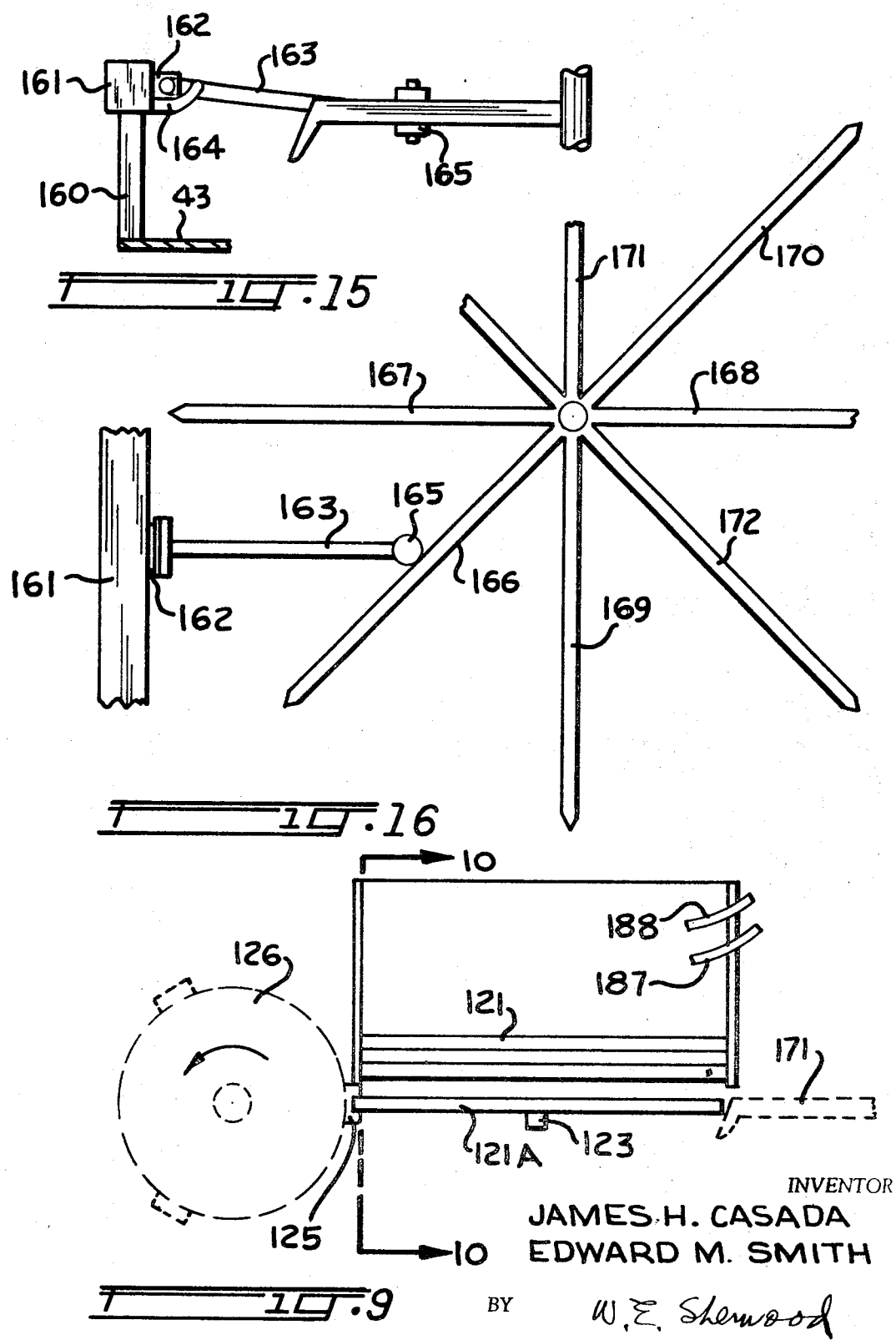

TOBACCO PLANT HARVESTER

BACKGROUND OF THE INVENTION

The conventional method of harvesting mature tobacco plants preparatory to curing of the tobacco in barns generally involves cutting the stalk from its root system adjacent the ground level, forming a slit in the stalk, and promptly impaling the stalk on a stick extending through the slit. Various forms of apparatus for carrying out this method by means of a vehicle moving along the row of standing tobacco have been proposed, but for various reasons have not found acceptance by the farmer. The present invention teaches the use of an improved apparatus involving the formation of an increased length of slit in the stalk by a turret mounted spear followed by the loading of the stick from the spear by reverse movement of the tobacco stalks from the loaded spear and utilizing the presence of the long slit in so doing.

The economic necessity for reducing the labor requirements in harvesting tobacco plants is well known, and conventional apparatus in which not more than one or two workers are required for harvesting usually entails a slow movement of the harvester through the field and with frequent interruptions of its movement. Moreover, when the prime mover for the harvester cannot be disconnected and employed for other farming purposes the cost of the harvester assembly becomes prohibitive. It is these and other disadvantages of the conventional tobacco stalk harvesters which it is a purpose of our invention to overcome.

SUMMARY

The present apparatus includes a frame which is towed by a tractor detachably connected thereto and with the tractor having a hydraulic system and a power takeoff which drive the necessary elements for the several harvesting steps of operation. A turret equipped with equally spaced, generally horizontal spears with a downwardly inclined impaling point is actuated by the hydraulic system in timed sequence with the actuation of a stick magazine; a transfer arm for displacing spear-impaled stalks onto a stick; and a mechanism for placing the loaded stick in position for removal by a second operator other than the driver of the tractor.

The power takeoff from the tractor continuously drives a conventional conveyor system mounted on the frame for moving severed stalks of tobacco in upright position to adjacent the station for impaling of the stalks on the spear. In addition, the power takeoff drives an improved means for centering the stalks with respect to the spears point and which also initiates the sequence of operation of the hydraulic driven elements when a predetermined number of stalks is fed to a given spear.

Among the objects of the invention are the provision of an improved tobacco stalk harvester which can be operated by two workers using a conventional tractor as its power source; a harvester which may be operated continuously during a prolonged harvesting operation; a harvester which results in a decreased amount of damage to the leaves of the tobacco; and improved spear which forms an optimum split in the tobacco stalk; and a harvester which does not require a priming of the tobacco stalk prior to harvesting of the stalk.

These and other objects and advantages of the invention will become more apparent as the description proceeds and when considered in conjunction with the accompanying drawings in which FIG. 1 is a diagrammatic view of the harvester indicating the location of the several movable parts and with the frame portions shown detached from each other.

FIG. 2 is a plan view of the turret showing the relative locations of spears, channels and vanes.

FIG. 3 is a view taken on line 3-3 of FIG. 2.

FIG. 4 is a view taken on line 4-4 of FIG. 2.

FIG. 5 is a view of the latching plate taken on line 5-5 of FIG. 3 and indicating certain features of the turret and crosshead assembly.

FIG. 6 is a diagrammatic plan view showing the positions occupied by the spear, channel and stalk centering means during the loading of a spear.

FIG. 7 is a view taken on line 7-7 of FIG. 6.

FIG. 8 is a schematic view of the hydraulic system employed for actuating the several tobacco-handling elements in timed sequence.

FIG. 9 is an elevation view of portions of the stick dispensing structure.

FIG. 10 is a side elevation view taken on line 10-10 of FIG. 9.

FIG. 11 is a schematic view of the mechanism for transferring the stalks from the spear to a stick and showing in plan the relative locations of certain parts.

FIG. 12 is a schematic view of the mechanism of FIG. 11 and showing in elevation the relative locations of certain parts.

FIG. 13 is a schematic view of one arrangement for actuating the loaded stick liftout mechanism.

FIG. 14 is a schematic view showing the relative locations of the rotatable parts employed with the liftout means of FIG. 13.

FIG. 15 is a side elevation view of the turret rotating arm in engagement with a spear and, FIG. 16 is a plan view of the structure shown in FIG. 15.

Referring now to FIG. 1, the harvester will normally be towed along a row of standing tobacco by a tractor 10 equipped with the conventional power takeoff shaft 11 and with an auxiliary hydraulic system 12 having conduits 13, 14 extending from the tractor. A hitch member 15 is attached to the tractor and contains a pair of horizontal coupling members 16, 17 extending generally normal to the direction in which the harvester is to travel.

A first section of a subframe includes a beam 18 having coupling members 19, 20 adapted to be engaged respectively with members 16, 17 and to permit pivoting of the subframe in a vertical direction. A rearwardly extended beam 21 rigidly attached at its forward end to one end of beam 18 and, having a brace 22 extending from its rearward end to the other end of beam 18, carries a trailing wheel 23. Projecting from the outer side of beam 21 is a pair of spaced horizontal coupling members 24, 25.

A second section of the subframe includes a beam 30 generally parallel to beam 21 and rigidly joined at its rear end to a stub axle 31 carrying a wheel 32 at its distal end. The forwardly extending beam 30 has a brace 34 joining its forward end to the axle adjacent the wheel 32. Projecting laterally from beam 30 is a pair of spaced horizontal coupling members 35, 36 adapted to be engaged respectively with members 24 and 25 and to permit pivoting of the second section of the subframe in a vertical plane which is normal to the vertical plane in which the first subsection may pivot. Upstanding from the axle is a pair of spaced coupling members 37, 38 extending horizontally.

A third and main frame portion for mounting of the tobacco handling elements of the machine is provided adjacent its rear edge with spaced horizontal coupling members 40, 41 adapted to be engaged respectively with members 37, 38 and to permit pivoting of the main frame portion in a vertical plane along the direction of travel of the harvester. This main frame includes a laterally extending portion 42 which preferably overlies the first section of the subframe, a rearward portion 43 which overlies the second section of the subframe, and a bifurcated forwardly projecting portion 44 which extends alongside the tractor and which mounts pony wheels 45, 46 adjacent the forward ends of the bifurcated portion. Other wheels not shown may also be mounted on the main frame. Thus when the respective frame portions are assembled by joining of the coupling members, an articulated frame is provided which will serve both to retain the tobacco handling elements in predetermined relation to each other and to enable the harvester to traverse rough or sloping ground. Any suitable coupling members may be employed as, for example, simple pin and clevis couplings.

The main frame is suitably reinforced to form a rigid unit and has upstanding therefrom various superstructure elements, as will be later described. For the purposes of disclosure at this point, however, it is to be noted that the main frame mounts at a focal location a turret slide or crosshead 50 which is adapted to reciprocate along a pair of spaced rails 51 under the influence of double-acting linear actuator 52 carried on the main frame, and which in turn is supplied with motive fluid from the hydraulic system in a controlled manner. A double-acting linear actuator 53 carried on the main frame serves to actuate a stick dispenser 54; another double-acting linear actuator 55 carried on the main frame serves to actuate a transfer cradle arm 56; and still another double-acting linear actuator 57 carried on the main frame serves to actuate a rear-loaded stick liftout means 58.

Passing now to FIGS. 2 to 5, the turret includes a vertically mounted rod 60 having a plate or the like 61 rigidly fastened thereto and supporting in cantilever manner a plurality of spears disposed at equal distances radially of the rod. The spears are narrow in horizontal cross section and comprise a shank portion 62 extending horizontally from the support plate and a downwardly offset tapered distal portion 63 ending in a point 64. Both the upper tapered edge 65 (which enters the stalk as it is being impaled) and the lower tapered edge 66 (which enters the stalk as it is being transferred to a stick) preferably are beveled, and the dimensions of the spear are such that a slit of about 10 inches length is formed in the impaled stalk and about five separate stalks can be accommodated on one spear.

Rigidly supported upon each spear as by a pair of spaced flat struts, one of which is shown at 67, is a horizontally extending open-ended, stalk-butt confining channel. The floor portion 69 of the channel has its forward end terminating slightly nearer the rod 60 than the point of the spear, and the sidewalls of the channel, one of which is seen at 70, are cut away at their forward ends. A pair of resilient guides, one of which is seen at 71, project forwardly of the cut away walls. The channels and the attached spears lie in the corresponding vertical planes. As seen in FIG. 2, each channel is provided with a forwardly projecting bayonet member 72 attached to one of its sidewalls, the purpose of which will later appear.

Adjacent the upper end of rod 60 a collar 73 is attached, and extending radially from that collar is a plurality of arms 74 carrying enlarged flat tobacco leaf confining vanes 75, or equivalent leaf supports, at their distal ends. Under these vanes and supported thereby is a circular ring 76, preferably of resilient material, serving to limit the radial inward movement of the harvested tobacco as it is being impaled on the spear. As seen in FIG. 2, the vanes are disposed radially on rod 60 at equal distances from the adjacent spears.

Adjacent the lower end of rod 60 an indexing plate 80 having equally spaced notches 81 in its periphery is attached to the rod, the lower end of which is suitably formed to be rotatably mounted in crosshead 50 with a friction reducing bearing between the same. A spring-loaded ball or the like 82 carried by the crosshead is adapted to engage in the respective notches. The crosshead is provided with suitable friction reducing means such as rollers 83 engageable with the rails 51 on the main frame.

Referring again to FIG. 1, any suitable means for cutting the standing tobacco stalk from its root system and for conveying the stalk to the spears of the turret may be employed, and as such forms no part of the present invention. We prefer to use for this purpose an apparatus of the type as disclosed in the patent of William C. Irvine, U.S. Pat. No. 2,813,390, and which has a cutting saw 90 disposed at the mouth of the bifurcated portion of the main frame and which saw is driven by a separate internal combustion engine 91 mounted on the frame. A conveyor system driven from the power takeoff shaft 11 through suitable gearboxes, sprockets, and chains moves the stalk in upright position and with its cut off butt end contacting the floor of portion 44 of the main frame rearwardly between guiding shrouds until it encounters the stalk centering means as best seen in FIG. 6 and 7. This centering means includes a lower pair of conveyor chains 92, 93 having spikes projecting laterally outwardly therefrom, and an upper pair of similar chains 94, 95. The respective upper chains are engaged with four sprockets 96 to 99 carried on shafts 100 to 103, and the lower chains are engaged with similar sprockets carried by the same shafts, two of such lower sprockets being seen at 104, 105. The shafts 102 and 100 may, for example, be driven in unison by a suitable gearing disposed beneath the main frame, and actuated by the power takeoff shaft 11.

The described centering means receives stalks of tobacco conveyed to it from the conveyor system at the forward end of the main frame, and the butt end of each stalk is then confined between the spike on the upper and lower chains as the rearward movement of the upright stalk is continued jointly by the centering means and by the main conveyor system. The spikes bite into the stalk material and, while the stalk is carried rearwardly, the offset tip 64 of the spear then pierces the stalk, preferably at a location about 4½ inches from the butt end. The confinement effected on the lower end of the stalk aided by the upwardly sloping edge 65 of the spear then causes the slit S (FIG. 7) to open upwardly, rather than downwardly as the stalk is speared. As will be understood, the pivoted traveling sweep arms 106 associated with Irvin-type conveyors serve to push the thus impaled stalk along the spear until it reaches its allotted position on the spear and without any particular spacing being required since the stalks are later to be withdrawn in reverse order from that spear. As the spear is filled by successive stalks, the tobacco leaves are held between adjacent vanes 75 on each side of the spear being loaded. Moreover, the channel associated with the spear being filled is of such dimension that it fits between the shafts 100, 102 and receives the butt ends of the impaled stalks. Although the turret at this time is indexed by means of the detent engaging in plate 80, it is essential that no turret rotation occur (such as by bouncing of the harvester on rough ground). In the insertion of and withdrawal of the spears and channels with respect to the functioning of the described centering means, we therefore provide a clip 110 fixedly mounted on main frame 43 and which receives the bayonet 72 of the channel and further insures against accidental turret rotation.

At a suitable location, a conventional rotatable stalk counting means 111 having arms (here shown as five) projecting into the path of movement of the stalks being impaled, is provided. Extending from this counter is a valve actuator 112 which in turn actuates a valve 113 in the hydraulic system when five stalks have been impaled, and for the purpose now to be described.

Referring now to FIG. 8, various means may be employed for actuating the several tobacco-handling elements in proper sequence and in one form of system we use a series of conventional four-way directional control valves 113 to 116 of the single-spool type associated with the respective cylinders 52 to 57 of the linear actuators. Such valves, for example, may be the Model CV- 200 available from Engergy Mfg. Co., Monticello, Iowa. When electrical energy is available, these valves can be solenoid actuated in a circuit employing switches associated with the linear actuators and without departing from the invention. However, as herein disclosed we employ mechanical linkage carried on the main frame. Any suitable linkages 117, 118 and 119 moved respectively by the piston rods or other parts of the actuators 52, 53 and 55 serve to reverse the settings of valves 114, 115 and 116 respectively when those piston rods of the corresponding actuators reach the limits of their travels, as will later appear. In addition, a linkage 112A associated with actuator 52 is employed to reverse valve 113.

Upon completion of the rearward movement of piston rod 84, for example, the linkage 112A shifts valve 113 to its neutral position and at the same time the linkage 117 is actuated to shift valve 114 and to cause the piston rod 120 (FIG. 10) of the stick dispenser 54 to move forwardly under the stick magazine in which a series of sticks 121 are arranged to fall by gravity or otherwise into loading position. A plate 122 at the forward end of rod 120 pushes the lowermost stick in the magazine along a rail 123 and into position 121A in direct prolongation of a loaded spear 171 (FIG. 9) and the extended rod 120 prevents the next successive stick of the magazine from falling. As the stick is pushed to its described position, one end of the same is engaged in a clip 125 attached to a rotary plate 126 serving as part of the loaded stick liftout means 58. The rotary plate, which preferably has three such clips equally spaced about its periphery, is so located as to hold the stick 121A in proper position with respect to the spear during the transfer of tobacco stalks from the spear to the stick. Upon completion of its forward movement, the rod 120 actuates linkage 118 which shifts valve 115 to its alternate position thereby to cause the piston rod 130 (FIG. 11) of the transfer mechanism to move forward toward the turret. At this same time, valve 114 returns to its normal position.

Rod 130 has rigidly attached at its distal end a carriage 135 which slides on a rail 136 supported by the floor 42 of the main frame. Laterally of the carriage a rod 137 is journaled for rotation in bushings 138. Extending from the rearward end of rod 137 is an upwardly inclined transverse arm 139 provided with an extension 140 generally parallel to rod 137, and projecting from this extension is another and longer transverse arm 141. The arm 141 extends toward the stick dispenser 54, and is sufficiently long to reach beyond the stick 121A. Arm 141 may be formed of resilient material to minimize damage to the tobacco leaves which it contacts. As will be apparent, during retraction of piston rod 130, the arm 141 is so positioned as to push against the first impaled stalk on spear 171 and thus to push all stalks from that spear and onto stick 121A as the piston rod retracts. The transverse arm 139 carries spaced rollers 145, 146 thereon and roller 145 is adapted to engage a curved, stationary track 147 affixed to the main frame as the transfer of the stalks from the spear to the stick is completed. This engagement causes the rod 137 and its attached parts to rotate counterclockwise as indicated in FIG. 12 and to bring roller 146 into contact with track 148 which likewise is stationary and has a curved, upwardly inclined distal end 149. When so rotated, the arm 141 will be in a plane which will not interfere with the lifting of the filled stick 121A nor with the tobacco on the next successive spear as the mechanism moves forwardly on its next stroke. The arrangement and weight of the described arms is such that they will occupy a position as indicated generally by the dotted lines of FIG. 12 during such next stroke and until roller 146 engages the curved end 149 to cause arm 141 to flip downwardly above the spear.

Upon completion of its rearward movement piston rod 130 actuates linkage 119 which shifts valve 116 to cause piston rod 150 (FIG. 13) of the loaded stick liftout mechanism to move forwardly. The movements of this piston rod involves essentially a conversion of linear to rotary motion and for this purpose any conventional mechanism may be employed. For example, a shaft 151 mounted in a bushing 152 of a pedestal 153 supported from the main frame 42 fixedly carries thereon the plate 126; a ratchet brake plate 154; and a plat 155 having suitable cam slots therein with which a slide 156 at the distal end of piston rod 150 is in engagement. Forward movement of the rod 150 effects counterclockwise rotation of the plate 155, but retracting movement causes no rotation of the plate. When the 120° rotation is completed, and the piston in actuator 57 reaches its rearmost position, the valve 116 is restored to its normal position and the cycle of tobacco handling is completed.

The described rotation of plate 126, which occurs while one end of a loaded stick 121A is engaged in a clip 125 on plate 126, serves to make ready for reception of the next stick that clip on plate 126 which lags 120° on the circumference of the plate, and also places the loaded stick in ready elevated position for offloading from the harvester.

Passing now to FIGS. 15 and 16, as will be apparent, the turret may be rotated only when such rotation will not cause interference of the spears and channels with the above described stalk-centering means and conveyor. Such rotation, accordingly, is initiated after a prescribed retracting movement, for example, about 7 inches, has been made by the crosshead 50 and is completed during the remainder, for example, about 7 inches, of retracting travel of the same. An upright 160 supported on main frame 43 adjacent the rear edge thereof carries a horizontal brace 161 of the superstructure and with a forwardly projecting bracket 162 thereon. Pivotally mounted in this bracket is a downwardly sloping sturdy abutment arm 163 limited in its downward movement by a stop member 164 and free to pivot upwardly. At its forward end the arm carries a roller 165 disposed in the plane of the spears on the turret, including the spear positions 166 to 172 as illustrated. The length of the arm is such that the turret will be retracted a sufficient distance to avoid interference of the loaded spear at position 168 with the conveyor and centering means before the roller 165 engages the empty spear at position 166. Continued movement of the turret rearwardly will then cause a counterclockwise rotation of the turret until spear 166 reaches a position as indicated at 169; the loaded spear 168 meanwhile moving to 170; the previously loaded spear at position 170 moving to a transfer position at 171; and the empty spear 172 moving to an impaling position at 168. As the rearward movement of the turret is concluded, the end of trailing spear 167 will engage one side of arm 163, but due to the inclined arrangement of arm 163 the roller 165 remains in contact with spear 166 until the turret rotation is completed even though arm 163 is being cammed upwardly. After the turret next moves forwardly, spear 167 will then occupy position 166 and will be pushed by roller 165 when the next rearward movement occurs. Moreover, as the turret crosshead reaches its rearmost position (FIG. 5) it contacts a projection 178 on rod 112A and shifts that rod so as to change the setting of valve 113 (FIG. 7) and to start the advance movement of the crosshead. Then when the crosshead reaches its forwardmost position, it contacts a similar projection 179 on rod 112A so as to effect the restoration of valve 113 to its normal position while awaiting the impaling of the fifth stalk on the spear.

TOBACCO HANDLING OPERATION

The described apparatus permits the harvesting of tobacco with only two operators, one of whom drives the tractor and with the other serving to remove the loaded sticks from the machine. As the harvester is driven along the row of tobacco, the power takeoff shaft 11 is rotating and the hydraulic lines 13, 14 are filled with pressure fluid from the pump in the system 12. The separately driven saw 90 cuts the successive stalks which, for convenience, may be estimated to be about 18 inches apart, and the conventional conveyor moves the cut stalks to their impaling position. As the first stalk is engaged by the spikes of the conveyor chains 92 to 95, it is centered and held so that the spear point enters the stalk at the proper place and causes the split S (FIG. 7) to extend upwardly of that stalk. Upon passing the arm of counter 111 the stalk is registered and is then pushed along the spear by the next succeeding stalk, meanwhile remaining in upright position on the spear and being prevented from falling sideways due to the adjacent vanes 75.

As the fifth such stalk is impaled, the following action occurs while the harvester continues its forward movement. A cam on counter 111 immediately triggers through rod 112 a resetting of valve 113 causing fluid to pass through conduit 180 from pressure line 13 to the forward end of actuator 52 (FIG. 5) and fluid to pass from the rearward end of actuator 52 into return line 14 through conduit 181. The crosshead 50 is promptly retracted carrying the turret with it and after about 7 inches of travel the spear 166 (FIG. 16) engages the roller 165 and rotation of the turret begins. This rotation is concluded by the time the piston in actuator 52 reaches its rearmost position and the linkage 112A is then actuated to reverse the setting of valve 113 whereupon pressure fluid flows from conduit 13 through conduit 181 to the rearward end of actuator 52 forcing the turret crosshead forwardly. Simultaneously, conduit 180 is connected to return line 14 and the next empty spear 172 (FIG. 16) with its associated channel are moved forward between the centering chains to engage the oncoming first stalk of the next cycle. Significantly, thus described complete turret movement takes place in a short time, for example, about 1.9 seconds.

As will be understood, the loaded spear formerly at position 168 (FIG. 16) is now at position 170 and the previously loaded spear from position 170 is now at position 171 in readiness for loading of a stick; the tobacco on both of the loaded spears being in an upright position. As will also be understood, upon reaching its rearmost position piston rod 84 has now through its connected linkage shifted the valve 114 so that pressure line 13 is connected to conduit 182 (FIG. 10) and conduit 183 is connected to return line 14. The piston rod 120 of actuator 53 is now moved forwardly and plate 122 pushes a stick from the magazine into position 121A in prolongation of the spear at position 171. As this stick reaches its allotted position, one end of the same is engaged in clip 125 on the plate 126, and simultaneously the valve 114 resets, thus to connect pressure line 13 again to conduit 183 and conduit 182 to the return line 14. The piston rod 120 is then retracted until another stick falls in place in front of plate 122 and simultaneously linkage 118 actuates valve 115 (FIG. 11).

as this occurs, pressure line 13 is connected to conduit 184 and conduit 185 is connected to return line 14. The piston rod 130 of actuator 55 now moves forwardly with the roller 146 on arm 139 riding on track 148. As the roller 146 engages the curved end 149 of that track the arm 141 is thrown across loaded spear adjacent the turret plate 61 and behind all of the stalks impaled on that spear. For assistance in properly pushing the stalks from the spear at this time, a lateral extension, 141A of the oscillatable rod 137, FIG. 11, is also thrown behind the impaled stalks, but beneath the loaded spear and contacts the stalk near its butt end while the arm 141 is in contact with the stalk at a higher elevation. The length of the extension 141A, of course, is such as to avoid interference with the spear when the extension is later lifted to the dotted line position of FIG. 12 Simultaneously with the described movements the valve 115 resets, thus to connect pressure line 13 again to conduit 185 and conduit 184 to return line 14. As the piston rod retracts carrying transfer arm 141 and extension 141A with it the stalks are pushed from spear 171 onto stick 121A. As the stalks, which had been in upright position, leave the confines of the vanes 75 of the turret, they contact resilient bushing arms 187, 188 mounted in elevated position on the edge of the magazine superstructure 54 and are caused to fall toward the elevated apron 189 (FIG. 1) on the rear edge of the main frame. Due to the enlarged slit in the stalk, however, this twisting action of the stalks on the stick is readily accommodated. Furthermore, as the piston rod 130 approaches its rearmost position, its linkage 119 actuates valve 116, and simultaneously the roller 145 on arm 139 engages the curved track 147 to throw arm 141 and extension 141A again to the dotted line position of FIG. 12.

Actuation of valve 116 at this time causes pressure line 13 to be connected to conduit 190 and return line 14 to be connected to conduit 191. The piston rod 150 of actuator 57 now moves forwardly and the engagement of its slide 156 with the slot in plate 155 causes that plate to rotate 120° counterclockwise. As this occurs the stick 121A loaded with tobacco stalks is pivoted upwardly into ready position for grasping by the operator, the weight of tobacco on the stick being supported by its piling upon the apron 189. At the end of this forward stroke of piston rod 150 the valve 116 is reset causing pressure line 13 again to be connected to conduit 191 and the return line to be connected to conduit 190. When rearward movement of the piston rod then occurs, the slide 156 moves freely to the rear without further turning of plate 155.

The second operator walking on the ground, or riding either the harvester or an adjacent vehicle, may then grasp the loaded stick and offload the same from the harvester. As will now be seen, the invention provides for the described rapid sequential operations, no one of which may be initiated until the previous one is concluded, but which nevertheless results in a continuous harvesting of tobacco. As an example, if it takes 9.5 seconds to spear five stalks, as when the harvester is moving at 0.55 miles per hours and the stalks are grown 18 inches apart, the operation of all of the mechanisms for stick dispensing, transfer of tobacco stalks from spear to stick, and liftout of the loaded stick will take place in the 9.5 second period.

In the interest of clarity, the various superstructure elements attached to the frame are not shown since they form no essential part of the invention. Such superstructure provides for longitudinal, transverse, and cross bracing, and affords support for the stationary shrouds guiding the cut stalks toward the centering means, for the stick magazine, for the turret rotating means, and the like.

Having thus disclosed a preferred form of tobacco plant harvester, it will be understood that the invention may be embodied in other forms than that described as being the preferred form.

What I claim is:

1. In a machine for harvesting tobacco, the combination comprising a rotatable turret having generally horizontal spears equally spaced radially and upon which severed stalks of tobacco are impaled, means for shifting said turret between a loading position and a retracted position, means for rotating said turret while in said retracted position thereby to displace from said loading position a spear loaded with stalks and to register in said loading position a successive empty spear, means for removing impaled stalks from the loaded and displaced spear, and means for transporting stalks to the spear occupying said loading position and simultaneously to center the stalks with respect to the spear while being impaled thereon.

2. Apparatus as defined in claim 1 wherein each of said spears includes a downwardly inclined impaling point penetrating the stalk adjacent its butt end and causing the split in the stalk to open progressively in an upward direction as the impaling occurs.

3. Apparatus as defined in claim 1 wherein said turret includes a plurality of open-top channel members associated respectively with each of said spears and serving as guides for the butt ends of the impaled stalks as said stalks are forced successively in upright position along said spear during the loading of the spear.

4. Apparatus as defined in claim 3 wherein said turret included radially projecting spaced means at an elevation above said spears serving to prevent tobacco loaded upon the spear in upright position from falling laterally.

5. In a machine for harvesting tobacco, the combination comprising a retractable turret having generally horizontal spears equally spaced radially and upon which severed stalks of tobacco are impaled, means for reciprocably shifting said turret between a loading position and a retracted position, means for rotating said turret while in said retracted position thereby to displace from said loading position a spear loaded with stalks and to register in said loading position a successive empty spear, means for positioning a stick in prolongation of a loaded spear, means for transferring stalks from a loaded spear onto said stick, means for moving the loaded stick into a position for removal of the same from the machine, and a hydraulic system connected to and adapted to operate each of said turret-shifting means, said stick-positioning means, said stalk-transferring means, and said loaded stick moving means in sequence.

6. Apparatus as defined in claim 5 wherein said means for rotating said turret comprises an abutment contacting an empty spear occupying a position at an angle to the direction of movement of said turret during its retracting movement and effecting a rotary movement of the engaged spear while in contact therewith.

7. Apparatus as defined in claim 5 including means on said loaded stick moving means for holding one end of the stick during the transfer of stalks to the stick.

8. Apparatus as defined in claim 7 wherein said loaded stick moving means is rotatable following the loading of stalks on the stick and is adapted to elevate one end of the loaded stick into an accessible position for manual grasping by an operator.

9. Apparatus as defined in claim 5 wherein said means for transferring stalks includes a reciprocable arm oscillatable adjacent the ends of its path of travel and adapted when at one extremity of its reciprocation to overlie the loaded spear and at the other extremity of its reciprocation to swing to one side of the loaded stick.

10. A machine for harvesting tobacco including a rotatable turret having generally horizontal spears equally spaced radially and upon which severed stalks of tobacco are impaled, means for reciprocably shifting said turret between a loading position and a retracted position, means for rotating said turret while in said retracted position thereby to displace from loading position a spear loaded with stalks and to register in said loading position a successive empty spear, means for positioning a stick in prolongation of a loaded spear, means for transferring stalks from a loaded spear onto said stick, means for moving the loaded stick into a position for removal of the same from the machine; each of said turret-shifting means, said stick-positioning means, said stalk-transferring means, and said loaded stick positioning means including double-acting linear actuators; separate valves respectively associated with each of said actuators and adapted to control the reciprocatory movement of said actuators, means for actuating said valves in sequence, and a hydraulic system connected to each of said valves and to each of said actuators.

11. Apparatus as defined in claim 10 including a stalk-counting means mounted adjacent said loading position and adapted to change the setting of the valve associated with the actuator for said turret-shifting means when a predetermined number of stalks are impaled on the spear in said loading position.

12. Apparatus as defined in claim 1 wherein said means for transporting stalks to the spear occupying said loading position includes a pair of endless, travelling chains spaced from each other on the respective sides of the path of movement of the stalk to the spear, said chains having stalk-engaging means for contacting the stalk above its butt end and below the point of entry of the spear into the stalk and for centering the stalk with respect to the spear as the stalk is moved by said chains toward said spear.